UNITED STATES PATENT OFFICE.

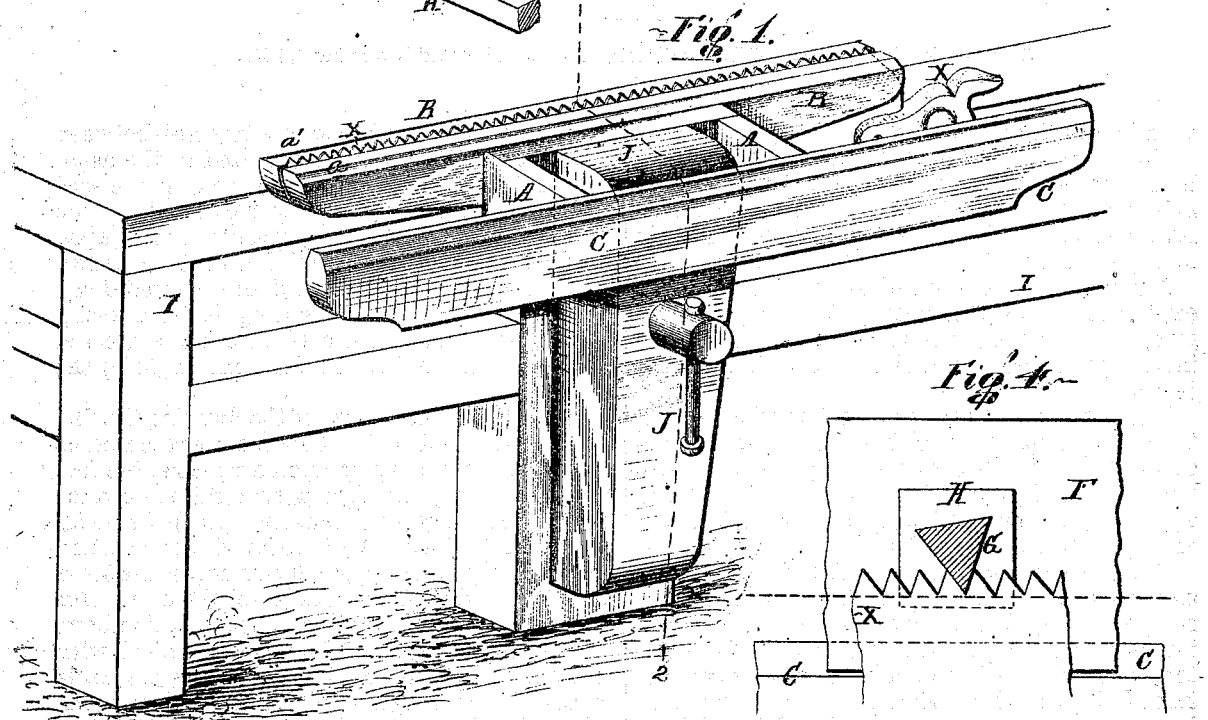

JOHN ADAM RAU, OF BETHLEHEM, PENNSYLVANIA.

IMPROVEMENT IN SAW-FILERS.

Specification forming part of Letters Patent No. 120,773, dated November 7, 1871.

*To all whom it may concern:*

Be it known that I, JOHN ADAM RAU, of Bethlehem, county of Northampton, State of Pennsylvania, have invented an Apparatus for Facilitating the Filing of Saws, of which the following is a specification:

My invention consists of apparatus, too fully explained hereafter to need preliminary description, for facilitating the sharpening of saws and insuring the accurate and uniform filing of the teeth.

Figures 1 and 2 are perspective views, illustrating my apparatus for facilitating the filing of saws and the method of securing the same to a work-bench; Fig. 3, a transverse section of the apparatus on the line 1 2, Fig. 1; and Figs. 4, 5, and 6, detached views of parts of the apparatus.

A represents an open box-like frame, to one side of which is secured, either permanently or so that it can be readily detached, one of the jaws a of a clamp, B, the other jaw a' of the latter being secured to the jaw a by spring-connections b, Fig. 3, which tend to separate the said jaws, excepting when they are forced together to hold a saw, as hereafter described. To the opposite side of the frame A, and in a position parallel with the clamp B, is secured a bar, C, the upper edge of which is V-shaped so that it may serve as a guide for a block, F, the latter being reversible, and having in both edges longitudinal grooves c c corresponding with the V-shaped upper edge of the bar C. An ordinary three-cornered file, G, such as is in common use for sharpening saws, is employed in connection with the apparatus. Instead of the usual turned handle, however, the file has a long square handle, H, adapted to and arranged to slide through an opening of corresponding shape in the guide-block F. In using the apparatus, it is secured to a work-bench, I, by means of an ordinary vise, J, the movable jaw of the latter being passed upward through the open frame A, and serving also to force the jaws of the clamp together, so as to confine between them the saw X to be sharpened, as shown plainly in Figs. 1 and 3.

The apparatus and saw having been thus firmly secured in position, the guide-block is placed upon the guide C and the file is passed through the opening in the same, so that it may extend across the cutting-edge of the saw. (See Figs. 3 and 4.) The file thus guided and held at the proper angle by the block F is inserted between the teeth of the saw, and operated in the usual manner for the purpose of sharpening the said teeth, the guide-block being moved along the bar C as the teeth are successively operated upon by the file, and permitting the latter to be drawn freely backward and forward and pressed down upon the saw, but preventing it from being turned, so that all of the teeth must be treated precisely alike and cut at the same angle by the file.

In the first four figures of the drawing the file, guide-block, and saw-holder are represented as arranged for operating upon a rip-saw, the file-handle passing through a straight transverse opening in the guide-block, and the file being inserted in the handle at about the inclination shown in Fig. 4, and being drawn across the teeth at right angles to the blade of the saw. For filing the teeth of a cross-cut saw, which have to be cut with beveled edges, a guide-block with an inclined opening, x', Fig. 5, is used, the angle of the file in respect to the saw being determined by this inclined opening in the guide-block, as shown in Figs. 5 and 6. As the opposite sides of the teeth of a cross-cut saw are beveled in different directions, one side of all the teeth will have to be operated on by the file while the latter is inclined in one direction, as shown in full lines in Fig. 5, and the opposite sides of the teeth while the file is inclined in a contrary direction, as shown by dotted lines. The angle of the file can be thus reversed by merely inverting the block, which, as before mentioned, is grooved on both edges, so that either may be adapted to the way on the bar C. The inclination of the file in respect to its handle, and the angle of the whole in respect to the saw, can be adjusted as desired; but whatever inclination or angle is determined upon for one tooth will be the same for all the teeth of the saw. Inasmuch as the block F can rock freely on its guide, the file may be inclined upward or downward at any angle which may be necessary to operate with equal effect on all the teeth. Machines in which the block F is capable of no rocking motion, so that the file cannot be inclined both upward and downward, are inefficient, as in new saws the points of the teeth frequently coincide with a line curved outwardly, requiring the file to be inclined upward to cut them, while all saws, after repeated use and sharpening, become curved inwardly in the center, the points of the teeth being on a concave instead of on a straight or convex line, as at first, so that the file, to reach the teeth, must be depressed. The file-handle may, in some instances, be simply widened and flattened at the bottom, so as to be merely held down upon a guide-block or bar, instead of passing through an opening in the same. This will effectually prevent the file from turning, and the teeth of a saw would be filed much more uniformly and with the exercise of less care on the part of the operator than usual.

I claim—

A block, F, having a transverse opening for the reception of a file-handle, in combination with a guide-bar, C, to which one or both edges of the block are adapted, and on which the block can both slide and rock, so that the file can be inclined either upward or downward, substantially as described.

In testimony whereof I have signed my name to this specification in the presence of two subscribing witnesses.

JOHN A. RAU.

Witnesses:
 C. E. PEISERT,
 O. A. LUCKENBACH. (131)